(12) United States Patent
Kawamoto

(10) Patent No.: US 6,169,902 B1
(45) Date of Patent: Jan. 2, 2001

(54) INFORMATION TERMINAL, PROCESSING METHOD BY INFORMATION TERMINAL, INFORMATION PROVIDING APPARATUS AND INFORMATION NETWORK SYSTEM

(75) Inventor: Yoji Kawamoto, Tokyo (JP)

(73) Assignee: Sony Corporation, Tokyo (JP)

( * ) Notice: Under 35 U.S.C. 154(b), the term of this patent shall be extended for 0 days.

(21) Appl. No.: 09/057,220

(22) Filed: Apr. 8, 1998

(30) Foreign Application Priority Data

Apr. 9, 1997 (JP) .................................................. 9-090698

(51) Int. Cl.⁷ ........................... H04Q 7/20; H04B 7/185; G06F 19/00; G06G 7/76; G06G 1/00
(52) U.S. Cl. .................... 455/456; 342/357.12; 701/117; 701/200; 701/208
(58) Field of Search .................................... 455/457, 456; 701/200, 117, 208; 342/357.13, 29, 37, 38; 340/990

(56) References Cited

U.S. PATENT DOCUMENTS

| | | | |
|---|---|---|---|
| 3,623,090 | * | 11/1971 | Gilbert et al. . |
| 3,936,828 | * | 2/1976 | Nuesse et al. . |
| 5,758,313 | * | 5/1998 | Shah et al. ............................ 701/208 |
| 5,848,373 | * | 12/1998 | Delorme et al. ...................... 701/200 |
| 5,959,577 | * | 9/1999 | Fan et al. ......................... 342/357.12 |
| 6,012,012 | * | 6/2000 | Fleck et al. ............................ 701/117 |
| 6,029,069 | * | 2/2000 | Takaki ................................... 455/456 |

* cited by examiner

Primary Examiner—William Cumming
(74) Attorney, Agent, or Firm—Limbach & Limbach L.L.P.

(57) ABSTRACT

An information terminal, interconnected through a radio-communication network, including a position acquisition unit for acquiring position fixing information that fixes the present position of own information terminal, a transmitting unit for transmitting through the radio-communication network on demand the position fixing information of own terminal acquired through the position acquisition unit and for transmitting through the radio-communication network a request command for requesting position-related information about each information terminal belonging to a group identified by a predetermined password number, a receiving unit for receiving from a user management table of an information providing apparatus through the radio-communication network the position-related information about each information terminal belonging to the group, and a display unit for displaying the information-related information of each information terminal received by the receiving unit. With a simple operation, the user of the information terminal constituting the predetermined group identified by the predetermined password number can visually grips the positions of other users through the radio-communication network at a glance.

11 Claims, 12 Drawing Sheets

FIG. 9

| BASE STATION ID | POSITION | |
|---|---|---|
| | LATITUDE NORTH | LONGITUDE EAST |
| 0001 | 35° 55' 20" ~ 35° 55' 30" | 135° 15' 19" ~ 135° 15' 55" |
| 0002 | 35° 55' 25" ~ 35° 56' 10" | 135° 15' 25" ~ 135° 16' 05" |
| 0003 | 35° 55' 30" ~ 35° 55' 49" | 135° 15' 20" ~ 135° 15' 45" |
| 0004 | 35° 55' 50" ~ 35° 54' 10" | 135° 15' 55" ~ 135° 16' 12" |
| 0005 | 35° 55' 10" ~ 35° 54' 30" | 135° 15' 05" ~ 135° 16' 10" |
| ⋮ | ⋮ | ⋮ |

INFORMATION TERMINAL, PROCESSING METHOD BY INFORMATION TERMINAL, INFORMATION PROVIDING APPARATUS AND INFORMATION NETWORK SYSTEM

BACKGROUND OF THE INVENTION

1. Field of the Invention

The present invention relates to an information terminal and an information processing method by the information terminal in which the owner of an information terminal knows positional information of another information terminal within a predetermined group in a radio-communication network that interconnects a plurality of information terminals.

2. Description of the Related Art

Global Positioning System (GPS) receivers that are typically used in navigational equipment are also installed on mobile vehicles such as a car. The GPS receiver receives positioning signals transmitted from a plurality of low earth-orbiting satellites for position fixing, and a user thus continuously knows the user's own position even in an area where the user is new.

There are several available information apparatuses having digital communication capability, into which the Personal Handyphone System (PHS) and Personal Digital Assistants (PDA) are integrated. One of such apparatuses displays the map surrounding the present position of own apparatus according to the identification number of an earth receiving base station during use, as disclosed in Japanese Patent Application No. 07-342579 (corresponding to U.S. patent application Ser. No. 08/772,405) filed by the same assignee as the present application.

Among users of information terminals having PHS capability, one user may want to know the present position of second user. In such a case, the first user calls the second user's information terminal over a radio-communication telephone to ask the present position. The second user, if new to the locality, checks the present position through the above positioning means, and answers the first user over the telephone (voice).

When a plurality of users, forming a group, want to know mutually their positions, each user has no choice but to telephone other users in the group person by person to ask all their present positions in voice.

To allow users of information terminals to know each other about their position in the conventional art, each user has to telephone the other users to get answers from them in voice. The user may perform a complex operation, and an answer in voice occasionally presents a difficulty of knowing an accurate position of another user.

SUMMARY OF THE INVENTION

Accordingly, it is an object of the present invention to provide an information terminal which, sticking to compact size and simple design, allows a user to know continuously and visually the positions of other users with a simple operation to the user's own information terminal.

The information terminal of the present invention interconnected through a radio-communication network comprises position fixing information acquisition means for acquiring position fixing information that fixes the present position of own information terminal, transmitting means for transmitting through the radio-communication network on demand the position fixing information of own terminal acquired through the position fixing information acquisition means and for transmitting through the radio-communication network a request command for requesting position-related information about each information terminal belonging to a group identified by a predetermined password number, receiving means for receiving through the radio-communication network the position-related information about each information terminal belonging to the group, and display means for displaying the position-related information of each information terminal received by the receiving means.

With this arrangement, a simple operation allows one user belonging to the group identified by a particular password number to know mutually visually the present positions of the other users all at a time within the same group through a radio network.

BRIEF DESCRIPTION OF THE DRAWINGS

FIG. 9 shows the content of a table containing the positional information of the PHS base station;

DESCRIPTION OF THE PREFERRED EMBODIMENTS

Figure 1:
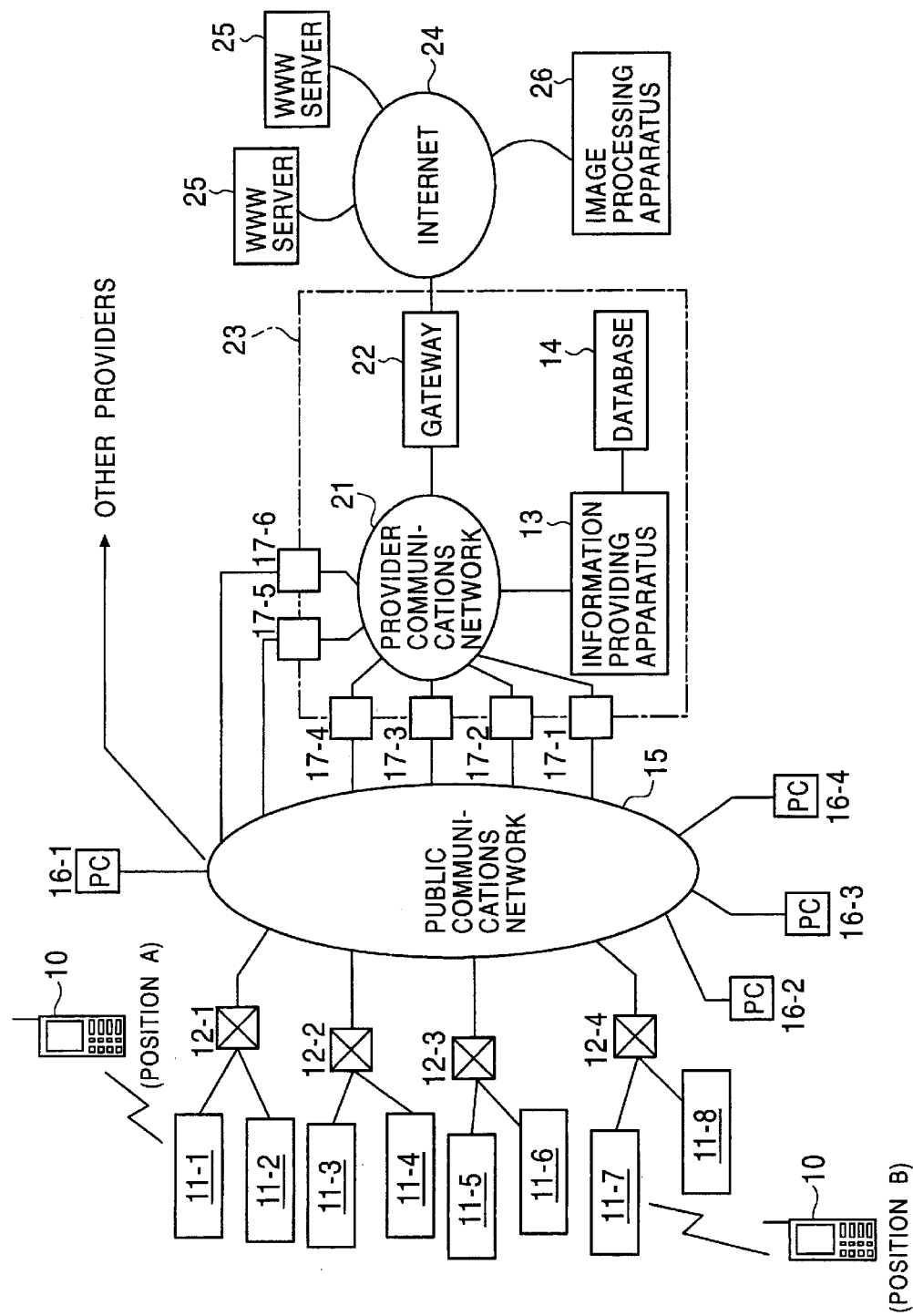
FIG. 1 generally shows a communication network system which interconnects information terminals of the present invention.

FIG. 1 generally shows a communication network system including a public communications network 15, which interconnects information terminals 10 and personal computers 16-1 to 16-4.

The information terminal 10 contains handy portable telephone means such as PHS and communicates with the nearby one of the base stations 11 constituting a radio-communication network that is provided by a common carrier operating a telephone system. The public communications network 15 that interconnects the information terminals 10 is linked to the Internet 24 through one of access points 17-1 to 17-6 and a communications network 21 owned by a provider 23.

The information terminal 10 thus establishes a communications link with the provider 23 through the nearby base station 11. The information terminal 10 having the communications link can access the Internet 24 a through a gateway 22 of the provider. In this way the information terminal 10 can search and retrieve information provided by any of servers WWW 25 connected to the Internet 24, and can also exchange information, for example, by way of electronic mail, with another processing apparatus 26 connected to the Internet 24. The information terminal 10 receives address management service for connecting itself to the Internet via the provider 23, from an information providing apparatus 13 called a server connected to the provider communications network 21 and a mailing service and information service between the information terminal 10 and other information processing apparatus or between information terminals.

Figure 2:
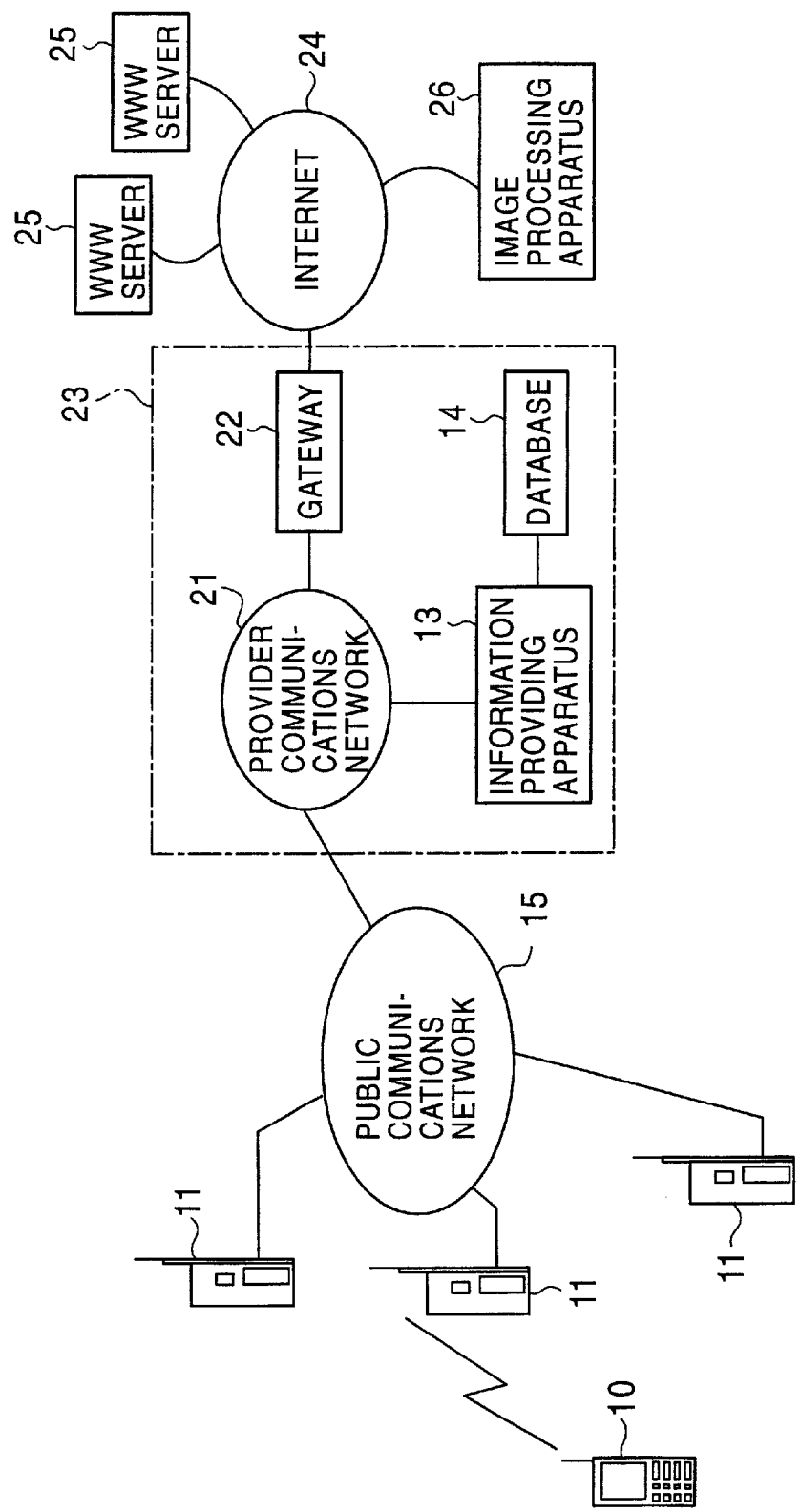
FIG. 2 shows a major portion of the information terminal of the present invention in the communication network system of FIG. 1.

FIG. 2 shows a major portion of the information terminal of the present invention in the communication network system of FIG. 1.

Each information terminal 10 is designed to connect to the public communications network 15 via the base station 11 (the information terminal 10 collectively represents information terminals 10-1, 10-2, 10-3, . . . and the same is true of base station 11 and exchange 12).

Each base station 11 is connected to the public communications network 15 through the exchange (or mobile communication control apparatus) 12. With this arrangement, exchange of voice or data is mutually made between the information terminals 10. The public communications network 15 is connected to the information providing apparatus 13 (or plurality of information providing apparatuses 13) having a database 14. Accessing the information providing apparatus 13 or by way of the information providing apparatus 13, each information terminal 10 can receive or transmit a variety of information or data as described with reference to FIG. 1.

Referring to FIG. 2, users A, B, C and D have information terminals 10-1, 10-4, 10-6, and 10-9, respectively, forming one group. Each user accesses the information providing apparatus 13 to register their own present positions. Each user receives the positional information of other users through a predetermined sequence from the information providing apparatus 13, and presents the received positional information of other users on the display of own information terminal. More description on this will be presented later.

Figure 3:
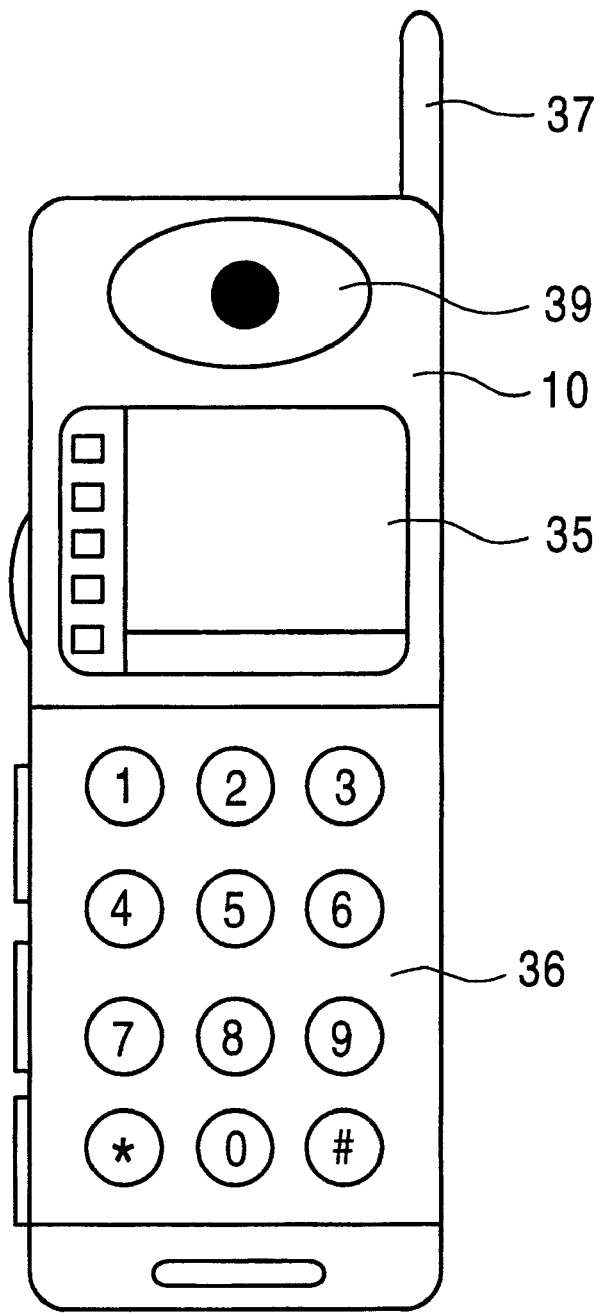
FIG. 3 shows one example of the external appearance of the information terminal.
Figure 4:
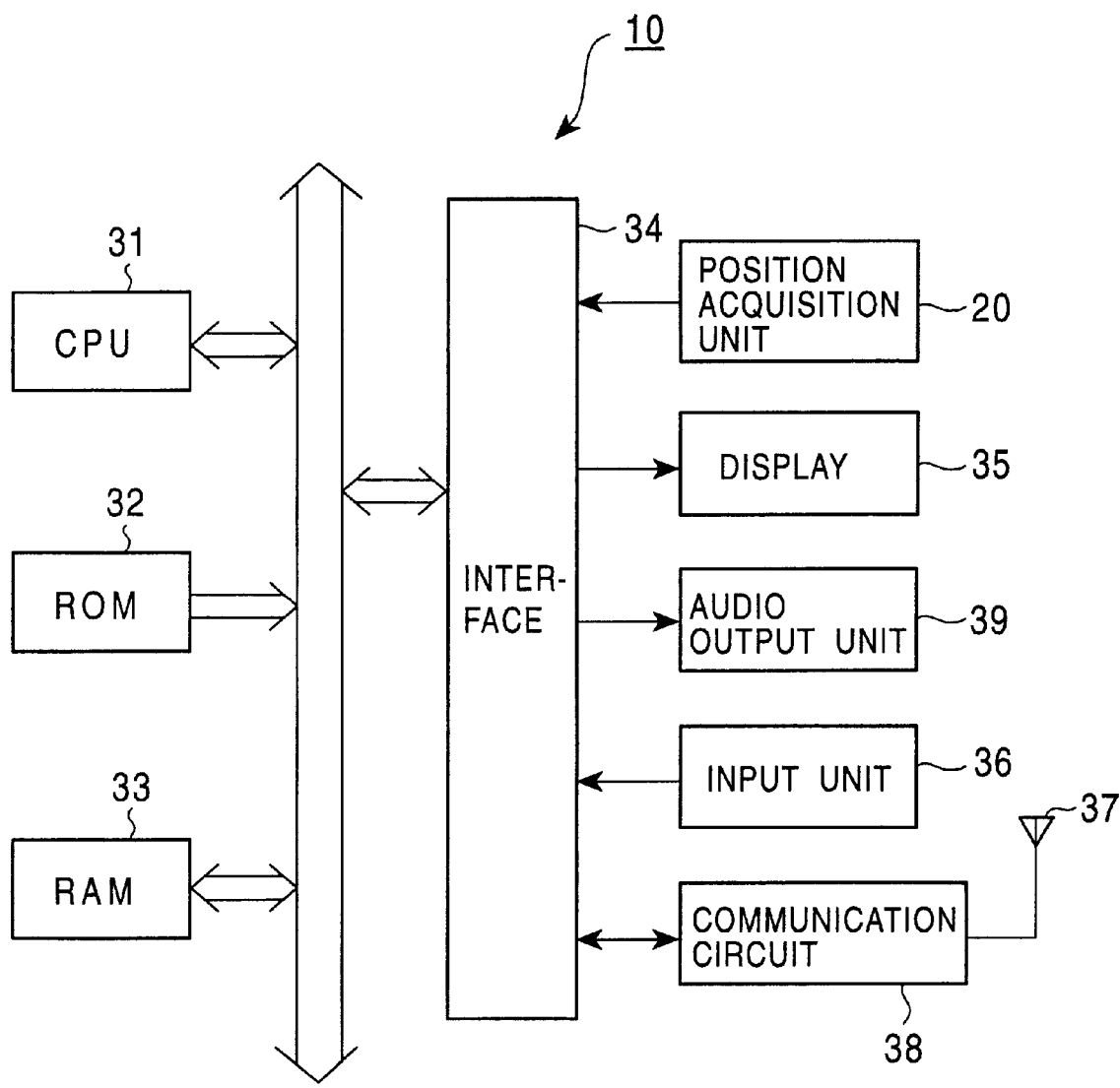
FIG. 4 is a block diagram showing the internal construction of the information terminal.

FIG. 3 shows the external appearance of one example of the information terminal 10 of the present invention, and FIG. 4 is a block diagram of the information terminal 10.

The information terminal 10 is a compact portable information processing device, having a personal digital telephone capability, such as a PHS set. Although the information terminal 10 has the appearance of a handy portable telephone as shown in FIG. 3, its internal organization is that of an information processing device as shown in FIG. 4.

Referring to FIG. 4, a CPU (Central Processing Unit) 31 performs a variety of information processings under the control of the program stored in a ROM (Read-Only Memory) 32. A RAM (Random Access Memory) 33 stores, as necessary, data CPU 31 needs to perform information processing function, and incoming external information and data. An input unit 36, having keys, buttons, switches and dials, receives predetermined information and commands for information processing. The input unit 36 also includes a microphone for speech conversation (telephone conversation function). An audio output unit 39 outputs through a loudspeaker a speech conversation of a partner or a sound signal produced in the terminal.

Since the information terminal 10 operates from a battery in principle, a display 35 is the one consuming less power, such as LCD (Liquid Crystal Display) display. The display 35 presents not only text information but also drawings and images.

A communication circuit 38, having antenna means 37, includes receiving means and transmitting means, and establishes a radiowave communications link with the nearby base station 11.

A position acquisition unit 20 acquires the present position of own terminal based on the ID number of the base station in use, and is available in several different techniques. More description on this will be given later.

The display 35, audio output unit 39, input unit 36, communication circuit 38, and position acquisition unit 20 are respectively connected to CPU 31 and the like by way of an interface.

Figure 5:
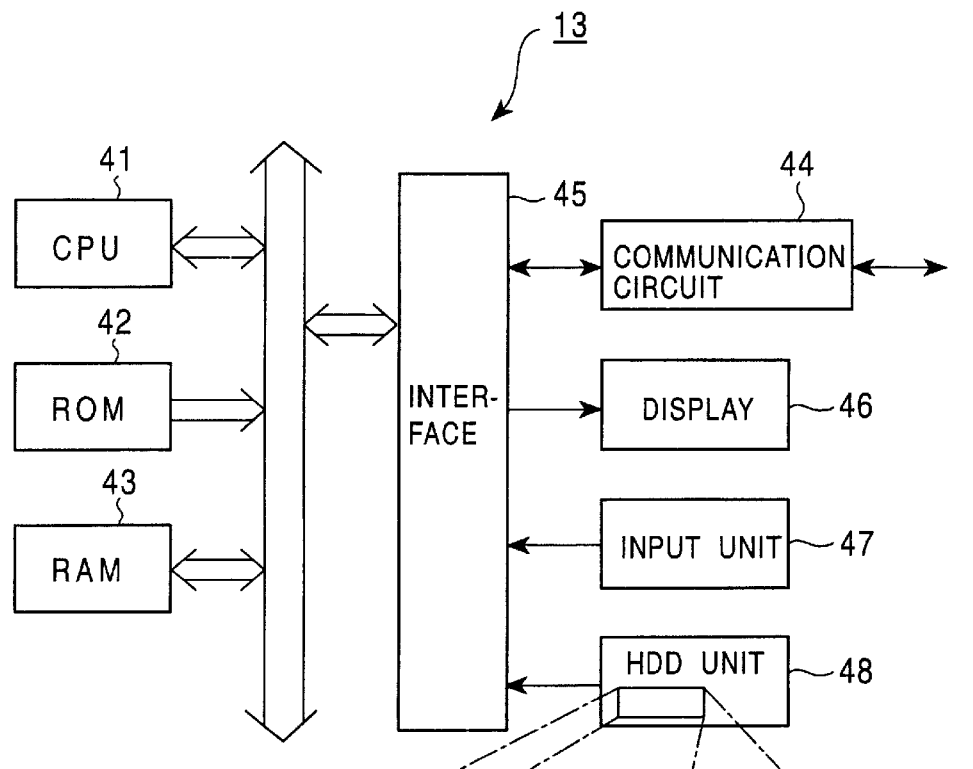
FIG. 5 is a block diagram showing an information providing apparatus in the radio-communication network.

FIG. 5 is a block diagram of the information providing apparatus 13. The functions of CPU 41, ROM 42 AND RAM 43 are identical to those of the counterparts in the information terminal 10. The information providing apparatus 13 includes a HDD (hard disk drive) 48. HDD 48 stores and read a large quantity of data and programs, and writes these data and programs onto RAM 43 as necessary for information processing. In view of functionality requirement required of it, the information providing apparatus 13 has a multi-task capability for executing concurrently a plurality of tasks.

HDD 48 stores a large quantity of digital images, for example, map information for each coverage area for which an information providing apparatus 13 is responsible, and reads and then outputs the map information as necessary.

An input unit 47, having a keyboard, a mouse and the like, issues commands to allow the information providing apparatus 13 to carry out a variety of information processings. An interface 45 performs interface function to circuits and internal buses. A display 46, constructed of a CRT or LCD, presents texts, drawings, and images on screen. A communication circuit 44 is responsible for the communication with the communications network via the public communications network 15.

Figure 6:
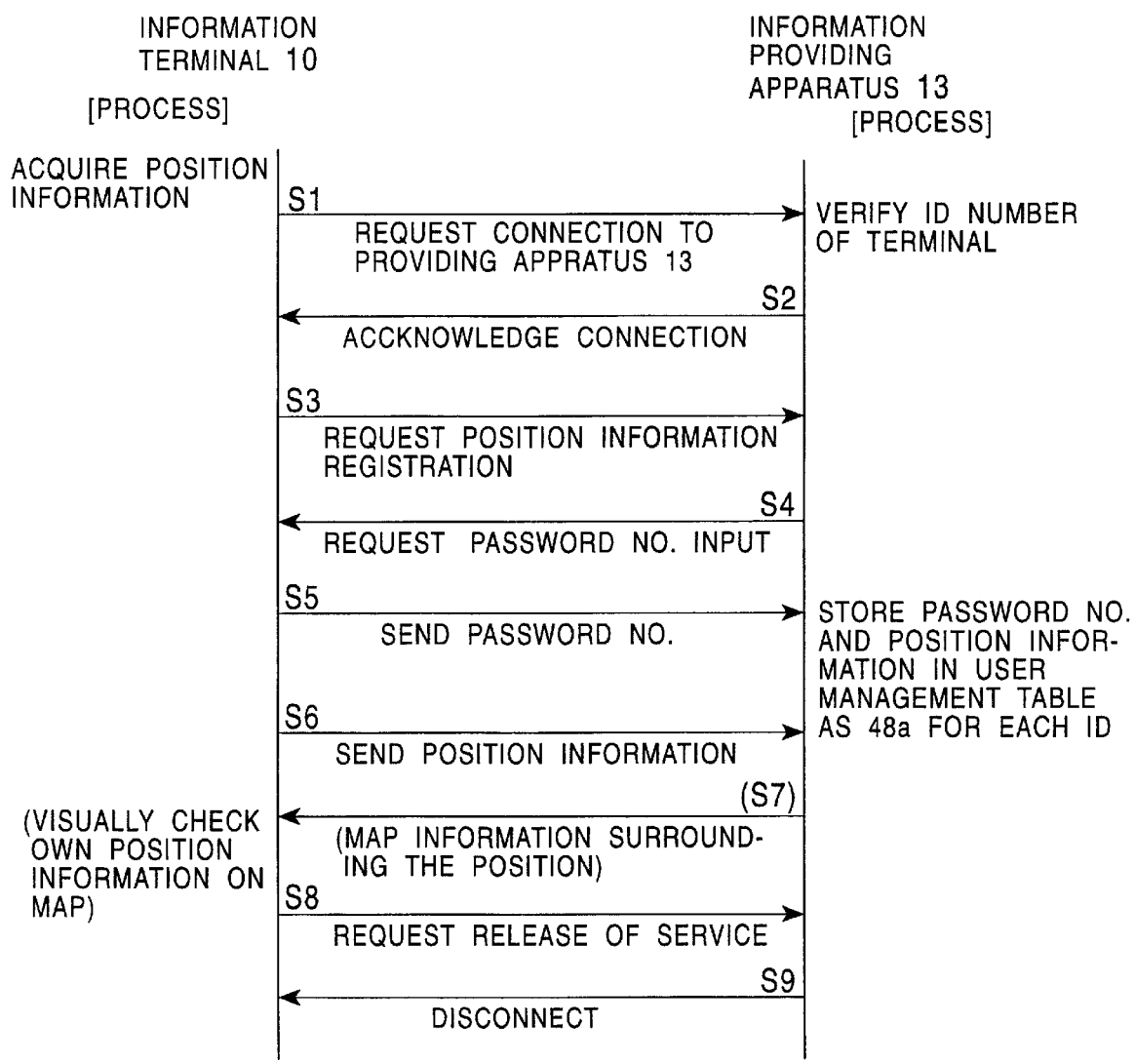
FIG. 6 shows a sequence for registering the present position of the information terminal in the information providing apparatus.

FIG. 6 shows a sequence for registering the present position of the information terminal 10 in the information providing apparatus 13, performed between the information terminal 10 and the information providing apparatus 13. As shown in FIG. 1, the four information terminals 10-1, 10-4, 10-6 and 10-9 constitute one group, and the users A, B, C and D have the information terminals 10-1, 10-4, 10-6, and 10-9, respectively.

Referring to the sequence diagram in FIG. 6, each information terminal 10 acquires its own present position through the position acquisition unit 20. The user of the information terminal 10 then transmits a line connect request to the information providing apparatus 13 (S1). After confirming the ID number of the information terminal 10 ($TID_1$, $TID_2$, . . . , for example), the information providing apparatus 13 sends a connection acknowledge signal (S2). The information terminal 10 sends to the information providing apparatus 13 a predetermined registration request signal about the positional information of own terminal (S3). In response, the information providing apparatus 13 requests the information terminal 10 to send the password number of the information terminal 10 (S4). In response to the request, the information terminal 10 sends first the password number ($SC_1$, $SC_2$, . . . , for example) (S5), and then sends the positional information acquired through the position acquisition unit 20 (Latitude North $N_1$ and Longitude East $E_1$, for example) (S6).

Receiving the positional information, the information providing apparatus 13 stores, in a user management table 48a in HDD 48, the ID numbers ($TID_1$, $TID_2$, . . . , for example) of the information terminals, registration dates (96/01/02/13.01.50, for example), password numbers ($SC_1$, $SC_2$, . . . , for example), and positional information (Latitude North $N_1$ and Longitude East $E_1$, for example), ID number by ID number, as shown in FIG. 5. In this way the positional information of each information terminal 10 is stored in the user management table 48a in HDD 48 as storage means of the information providing apparatus 13. To the information terminal 10 that underwent the registration procedure of the positional information, the information providing apparatus 13 sends the positional information along with the map information indicating the position of the information terminal 10 (S7) so that the information terminal 10 presents them on the display 35. Once the user, even if new to the locality, registers the user's own positional information, the user can recognize the surrounding map image with the user's own present position plotted thereon.

The information providing apparatus 13 may store a series of positional data of each terminal in a chronological order within a predetermined time band, or may store updated positional data only with the preceding data deleted. The above sequence describes only one example of the flow of control between the information terminal 10-1 and the information providing apparatus 13, and the present invention is not limited to this method.

Figure 7:
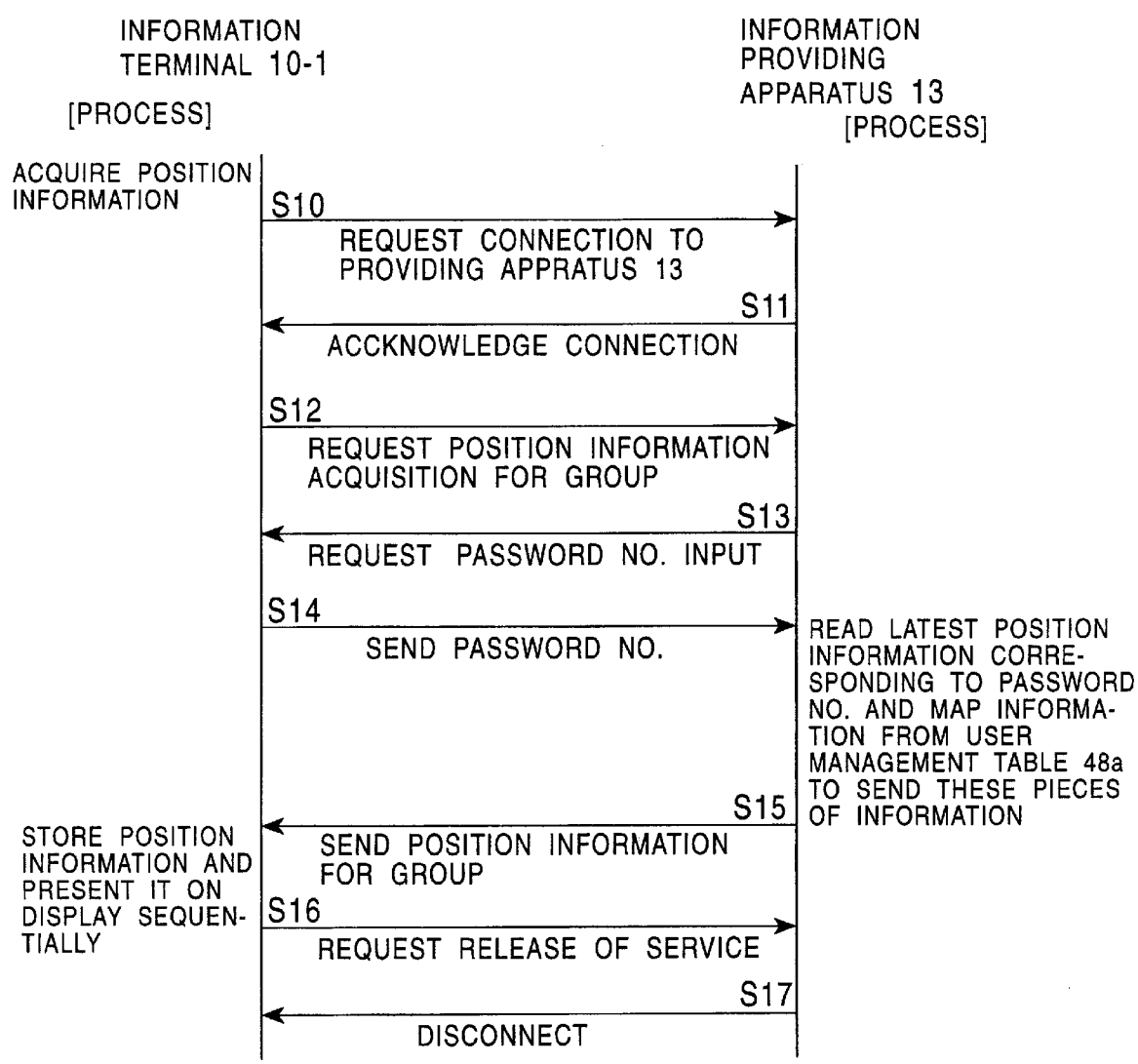
FIG. 7 shows a sequence for acquiring, from the information providing apparatus, the present position of the information terminal belonging to a particular group.

FIG. 7 shows a sequence taken by the user A of the information terminal 10-1 according to the present invention, in which the user A is informed of the updated positions of users B, C and D of information terminals 10-4, 10-6 and 10-9, respectively within the group.

The user A makes a connection to the information providing apparatus 13 using the user's own information terminal 10-1 (S10). When a line connection acknowledge signal comes in from the information providing apparatus 13 (S11), the information terminal 10-1 sends a positional information acquisition request signal of a predetermined group to the information providing apparatus 13 (S12). In response, the information providing apparatus 13 requests the information terminal 10-1 to send the password number ($SC_1$, for example) identifying the predetermined group (S13). When the information terminal 10-1 sends the predetermined password number ($SC_1$, for example) (S14), the information providing apparatus 13 reads, from the user management table 48a in HDD 48, positional information ($N_1$, $E_1$, $N_2$, $E_2$, $N_3$, $E_3$) for the ID numbers ($TID_1$, $TID_2$, and $TID_3$) of the information terminals belonging to the group having the password number ($SC_1$) shown in FIG. 5, out of the ID numbers ($TID_1$, $TID_2$, . . . , for example) of the information terminals whose positional data is stored according to the position registration sequence shown in FIG. 6. The information providing apparatus 13 also reads the map information surrounding the positions of the terminals together with the positional information and sends these pieces of information via the communication circuit 44 (S15). In the procedure for acquiring positional information, the position of the information terminal 10-1 of the user A is updated at the timing of communication. In this way the information terminal 10 requesting the positional information of the predetermined group stores in its own RAM 33 the positional information of each information terminal 10 belonging to the group.

The positional information means the updated positional information of information terminals 10-4, 10-6 and 10-9 owned by users B, C and D, respectively, and registered according to the position registration sequence. The information terminal 10-1 stores in RAM 33 the received positional information including the map information, and presents them visually on the display, for example in the order of the ID numbers.

The above positional information verification sequence is for example only of flow of control carried out between the information terminal 10-1 and the information providing apparatus 13. The present invention is not limited to this sequence. For example, the positional information acquisition request for the group may be accompanied by the password number (transmitted at S14 in FIG. 7). In such a case, the information providing apparatus 13 is not required to request the input of the password number thereto, and transmits the updated positional information of the information terminals belonging to the group of the password number.

The updated positional information may include the updated positional data of each information terminal, the date and time of communication, the neighboring map information presented on screen with the updated position of each information terminal plotted thereon, the ID number identifying each information terminal, the user name of each information terminal, and the image of the user's face. An example of the display of the positional information presented on the display 35 will be described later.

The radio-communication network used in the present invention provides two radio channel slots, with one slot for speech communication and with the other slot for the transmission of the positional information.

The position acquisition unit 20 of the information terminal 10 is now discussed. Several technical methods of acquiring positional information are currently available. With a view to getting the most precise position fix of each information terminal, the GPS system best suits the purpose of the present invention. The information terminal 10, including a GPS receiver, receives positioning signals transmitted from a plurality of (at least three) low-earth orbiting satellites through a GPS antenna, demodulates them in a receiver circuit, and computes the latitude and longitude of the present position in a GPS computing circuit. The information terminal 10 thus fixes its own accurate present position.

An information terminal having PHS function can acquire its own approximate positional information, not necessarily with the aid of the position acquisition unit 20 in FIG. 3. For example, an information terminal can know its own position based on the ID number of the receiving base station during telephone communication. The method for obtaining the positional information is discussed briefly below.

Figure 8:
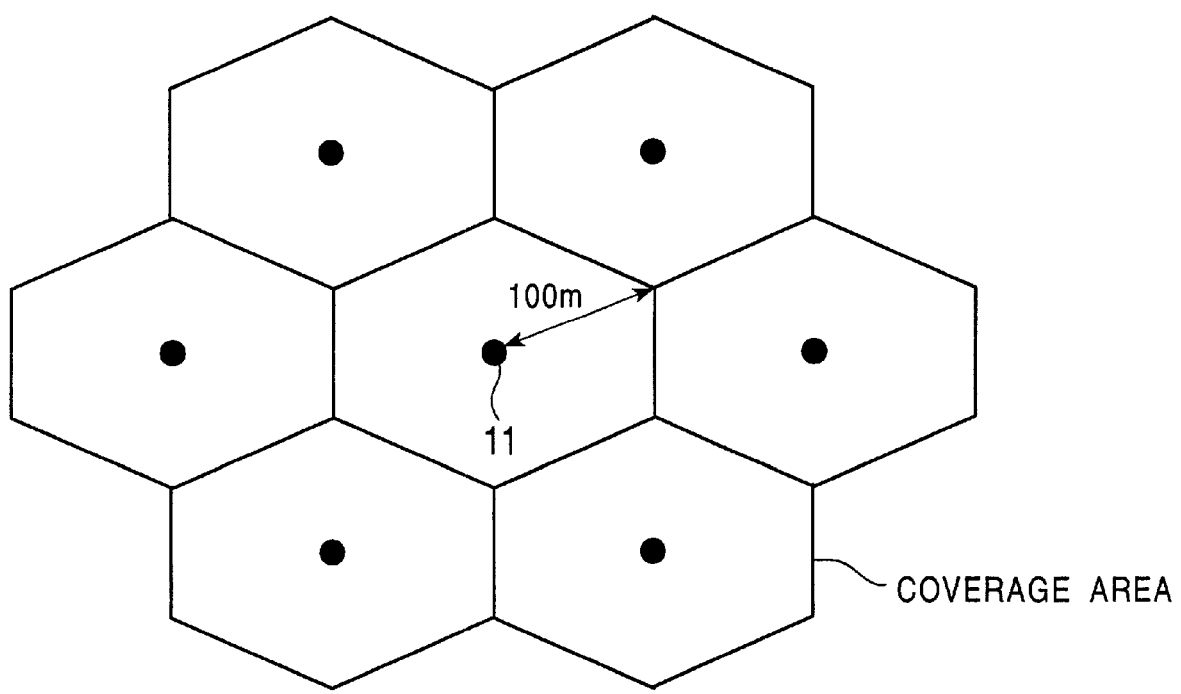
FIG. 8 shows the coverage areas of a PHS base station.

Referring to FIG. 8, the PHS system has generally circular coverage areas of about 100 meters radius, with one base station installed in the center of each coverage area. Each base station 11 makes a radio-communication with the information terminals 10 present in its assigned area. If this setup is applied to FIG. 2, the position of the user A of the information terminal 10-1 is determined to be within the assigned coverage area of a base station 11-1, because the base station 11-1 has the highest signal strength of radiowave from the information terminal 10-1.

Each base station is assigned an identification number (hereinafter referred to as base station ID number) for identifying itself. The position of each base station is known. The position of the information terminal is thus easily learned assuming that the present position of the information terminal coincides with that of the base station.

FIG. 9 is a reference table of positional data of each base station. The reference table lists the position of each base station identified by its ID number in latitude (north) and longitude (east). This table is beforehand stored in HDD 48 in the information providing apparatus 13 shown in FIG. 5. The position acquisition unit 20 of the information terminal 10 receives the base station ID number from the receiving base station 11. The base station ID number received is then sent to the information providing apparatus 13, which knows the present position of the information terminal 10 referencing the reference table for the base station ID number.

If the position of the receiving base station is regarded as the present position of the user of the information terminal 10, the real position of the user falls somewhere within the coverage area of the base station. To narrow the area within which the terminal is possibly present, the use of bearing detector means, such as an earth's magnetic field sensor, for detecting the motion direction of the user having the information terminal 10 is contemplated. It is also contemplated that an antenna having a directivity may be used for the antenna means 37 to narrow the possible area within which the information terminal 10 is present referring to the signal strength of the radiowave from the information terminal according to the bearing from the receiving base station to the information terminal 10.

Available as other positional information acquisition means is VICS (Vehicle Information and Communication System). In this system, a beam (traffic signal transmitter) installed in a predetermined position on a road transmits a radio signal to mobile vehicles such as cars. Since each beacon also transmits its positional information, the position of the beam is fixed by demodulated in a demodulator the radio signal received through a VICS receiving antenna. The position of the beacon is thus regarded as the position of the information terminal 10.

Any of the above-described techniques may be selected as the position acquisition unit 20 in the present invention in view of the application. The position acquisition unit 20 may be used in combination with bearing detector means. Depending on the purpose of the application, a plurality of different position acquisition means may be used.

Discussed next is a display example of the positional information, presented on the display 35 of the information terminal 10-1, of information terminals 10-4, 10-6 and 10-9 within the group identified by the password number, downloaded from the information providing apparatus 13.

As already described with reference to FIGS. 6 and 7, the information providing apparatus 13 stores, in HDD 48, the date and time of registration at the reception of position registration, the password number, and the positional data obtained by the positional information acquisition means on a per information terminal ID number basis. When the information terminal 10-1 places a transmit request for the positional information about a particular group by designating a particular password number, the information providing apparatus 13 reads, from its own HDD 48, the positional information of the terminals related to the password number, out of the ID numbers of a number of information terminals 10 of which positional data are registered, along with the neighboring map information including the positions of the related terminals. The information providing apparatus 13 then transmits them via the communication circuit 44. The updated positional information may include the updated positional data of each information terminal, the date and time of communication, the neighboring map information presented on screen with the updated position of each information terminal plotted thereon, the ID number identifying each information terminal, the user name of each information terminal, and the image of the user's face. These pieces of information are stored in HDD 48 in the information providing apparatus 13 in a sorted form on a per information terminal ID number basis. When the positional information includes a face image F, an information terminal receives image data possibly photographed by a digital camera, organizes it in HTML (Hypertext Markup Language), transmits it in HTTP (Hypertext Transfer Protocol) to the information providing apparatus 13 to be stored there. In a simple method, a streetside multimedia information terminal booth may be used to input the image data of the user into the information providing apparatus 13. The streetside multimedia information terminal booth offers for inexpensive price the service for registering, on a home page of the Internet, information such as the photograph of a person's face or profile of a person.

The information terminal 10-1 places the transmit request of the positional information to the information providing apparatus 13 in this way. The information terminal 10-1 then stores its own RAM 33 the positional information, sequentially transmitted from the information providing apparatus 13, on a terminal by terminal basis within the group. The information terminal 10-1 then presents them on the display 35 to allow the user to visually grip its own position.

Figure 10:
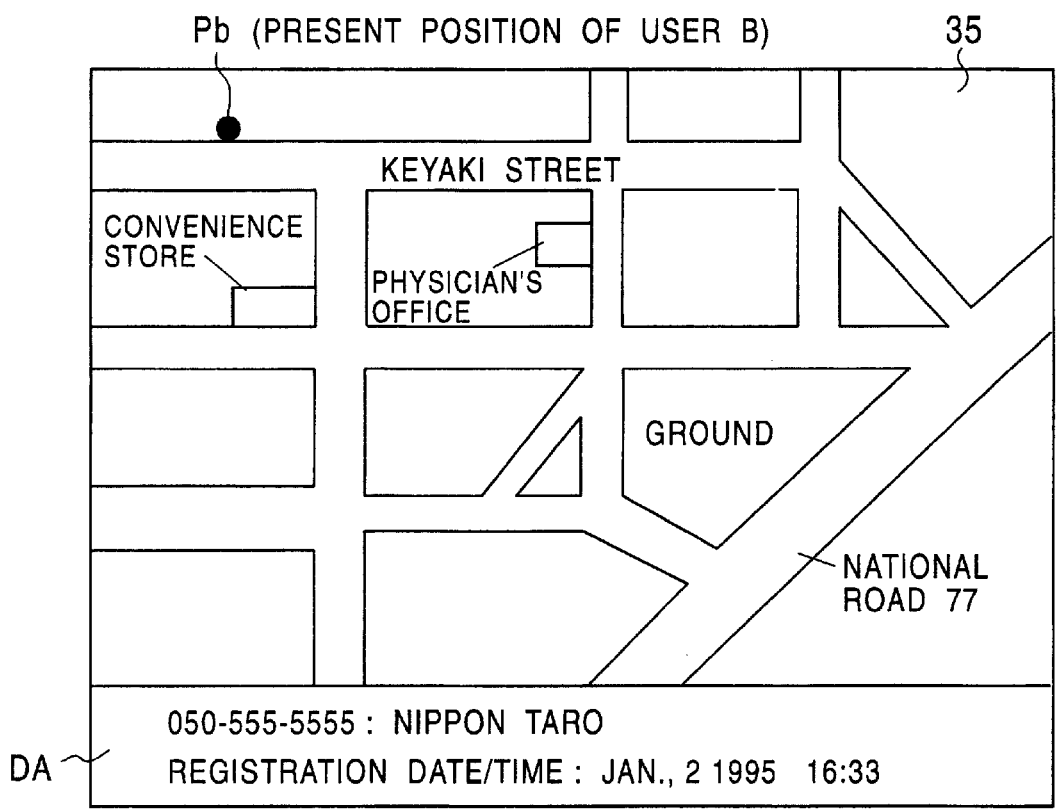
FIG. 10 shows one example of another user's positional information presented on the display of the information terminal.

FIG. 10 is one example of the display of the positional information of another information terminal 10-4, presented on the display 35 of the information terminal 10-1 requesting the positional information. As shown, the updated positional information of the user B of the information terminal 10-4 identified by the identification number (telephone number) 050-555-5555 is plotted on the neighboring map. The position of the user B is indicated by a flashing dot Pb on the neighboring map. Also presented on an owner information display area DA in part of the display screen are an identification number for identifying the user B whose position is indicated by the dot, and the date and time of registration at the time of the position registration. The user's name is also presented for identification in addition to the identification number in this example. Alternatively, the identification number only may be presented with no user's name indicated. These pieces of information may be stored in HDD 48 in the information providing apparatus 13 along with the ID number of own information terminal. Alternatively, these pieces of information may be stored in RAM 33 in own information terminal so that the information terminal 10-1 presents the user's name corresponding to the information terminal ID number 050-555-5555 in this case.

Figure 11:
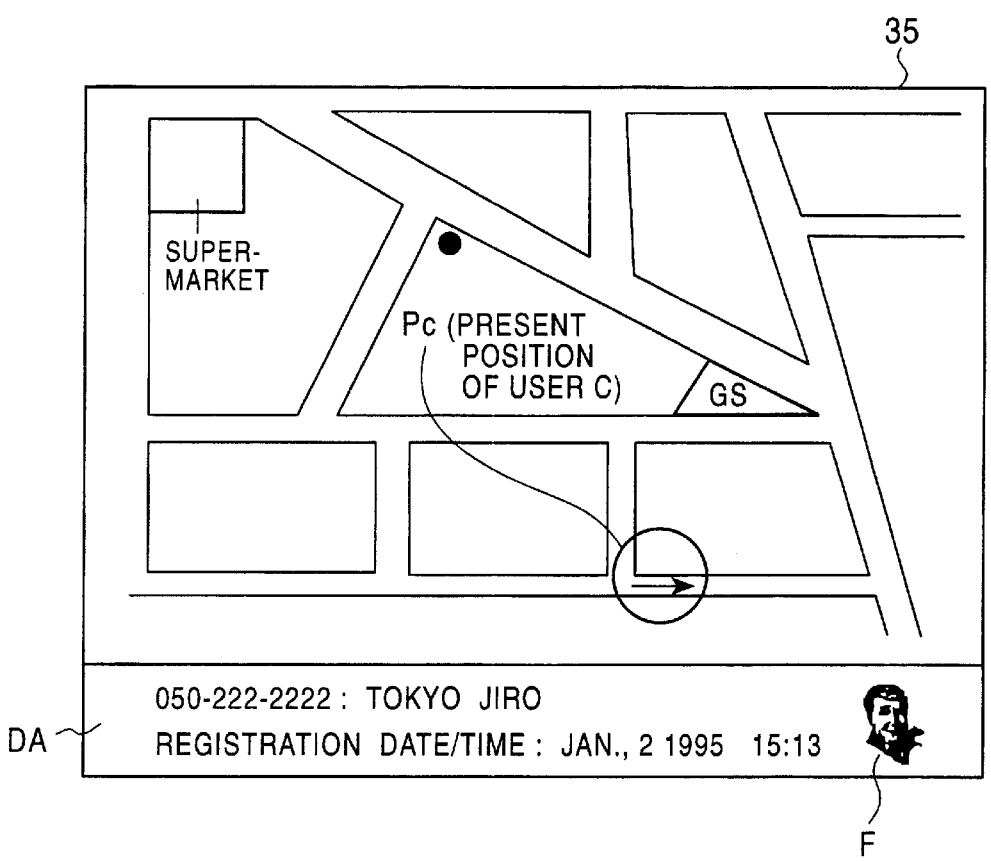
FIG. 11 shows one example of another user's positional information presented on the display of the information terminal.

FIG. 11 shows an example of the display of the updated positional information of the user C of the information terminal 10-6 identified by an identification number 050-222-2222, plotted on its neighboring map information. In this case, positional information acquisition means of the information terminal of the present invention is used in combination with bearing detector means. The updated position Pc of the user C is denoted by an arrow in a circle indicating the direction of motion. As in FIG. 10, the owner information display area DA shows the identification number identifying the user C and the user's name. Also presented there is the image of the user's face F. Optionally, the name of the user of the information terminal is not presented when the image of the user's face is presented.

Figure 12:
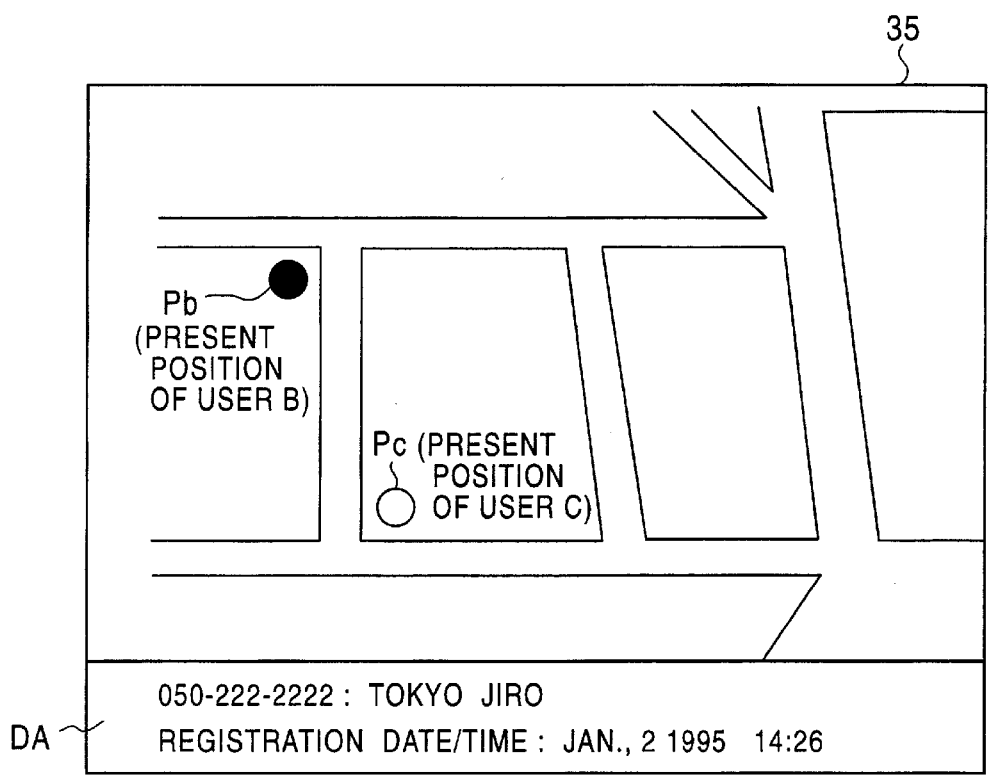
FIG. 12 shows one example of the positional information presented on the display of the information terminal in which two other users are present in the same map information.

FIG. 12 shows an example of the display in which the user registered positions of a plurality of information terminals 10 within the same group fall within the same map area. For example, the updated positions of the user B and the user C are in the same map screen, the position Pb of the user B is indicated by a dot flashing (or in an outstanding red color) and the position Pc of the user C is indicated by a (less outstanding) white circle. The owner information display area on the bottom portion of the screen shows the identification number and name identifying the user B whose position is indicated by the flashing dot, and the date and time of position data registration. In the same manner as in FIG. 11, along with the name or instead of the name, the image of the user's face may be presented on screen. A predetermined button or keystroke sequence switches the screen to show the position of the user C in a flashing dot and the position of the user B in a white circle. The owner information display area on the bottom portion of the screen then presents the data for identifying the user C. In such a position display of the information terminals 10 in the same group, the own terminal position (in this case, the position of the user A of the information terminal 10-1) can be also presented on a map screen.

In the presentation of the positional information of the users of the information terminals of the present invention within the same group, the positional information presented is based on updated and latest registered data in the information providing apparatus 13. Each user is thus required to perform the positional information registration described with reference to FIG. 6, subsequent each movement.

The above embodiment has been described in connection with the information terminal using the PHS system as the radio-communication network. The information terminal employing a digital cellular system falls within the scope of the present invention.

The concept of the information terminal of the present invention finds applications in a navigation device mounted on mobile vehicles such as cars.

As described above, the information terminal of the present invention sets a user free from such a complicated operation that the user telephones each of partner users to get an answer in voice communication when the user wants to know where the partner users are. With a simple operation, each user visually see the positional information of other information terminals of other users belonging to the predetermined group identified by the password number.

The present invention, sticking to compact size and simple and low-cost design, provides the portable information terminal working with a variety of positional information acquisition means.

What is claimed is:

1. An information terminal interconnected through a radio-communication network, comprising:
    position fixing information acquisition means for acquiring position fixing information that fixes the present position of a user's own information terminal;
    transmitting means for transmitting through the radio-communication network on demand the position fixing information of the user's own information terminal acquired through the position fixing information acquisition means and for transmitting through the radio-communication network a request command for requesting position-related information about each information terminal belonging to a group identified by a predetermined password number;
    receiving means for receiving, through the radio-communication network, the requested position-related information about each information terminal belonging to the group; and
    display means for displaying the requested position-related information of each information terminal belonging to the group received by the receiving means.

2. The information terminal according to claim 1, wherein the position-related information displayed by the display means is map information that indicates the present position of each information terminal belonging to the group.

3. The information terminal according to claim 2, wherein the position-related information displayed by the display means includes owner identifying information for identifying the owner of each information terminal belonging to the group.

4. The information terminal according to claim 3, wherein the owner identifying information includes one of the latest date of communication performed by each information terminal, the identification of the information terminal, the telephone information of the information terminal, the name of the owner of the information terminal, and a photograph of the owner's face.

5. The information terminal according to claim 1, wherein the position fixing information acquisition means acquires, as the position fixing information for fixing the present position of the user's own terminal, the ID number of a base station that establishes a communication link through the radio-communication network.

6. The information terminal according to claim 5, wherein the position fixing information acquisition means comprises motion direction detector means for detecting the direction of motion of the user's own terminal.

7. The information terminal according to claim 1, wherein the position fixing information acquisition means receives a positioning signal transmitted from a satellite constituting the Global Positioning System and acquires the position fixing information for fixing the present position of the user's own terminal based on the positioning signal.

8. The information terminal according to claim 1, wherein the position fixing information acquisition means receives a positioning signal transmitted from a transmitter constituting the Vehicle Information and Communication Global System and acquires position fixing information for fixing the present position of the user's own terminal based on the positioning signal.

9. A processing method by an information terminal connected through a radio-communication network, the method comprising:
    a position fixing information acquisition step for acquiring position fixing information that fixes the present position of a user's own information terminal;
    a transmitting step for transmitting through the radio-communication network on demand the position fixing information of the user's own information terminal acquired through the position fixing information acquisition step and for transmitting through the radio-communication network a request command for requesting position-related information about each information terminal belonging to a group identified by a predetermined password;
    a receiving step for receiving through the radio-communication network the requested position-related information about each information terminal belonging to the group; and
    a display for displaying the requested position-related information of each information terminal belong to the group received through the receiving step.

10. An information providing apparatus connected to a plurality of information terminals through a radio-communication network, the apparatus comprising:
    map information storage means for storing map information of a local area assigned thereto;

receiving means for receiving positional information of each information terminal fed through the radio-communication network by the plurality of information terminals;

positional information storage means for sequentially storing positional information received by the receiving means on a group by group basis, wherein each group is identified by a predetermined password number; and transmitting means for transmitting, in response to a transmit request of positional information fed together with the password number by the information terminal, the positional information of each information terminal belonging to the group identified by the password number, together with associated map information read from the map information storage means, to each information terminal belonging to the group identified by the password number.

11. An information network comprising a plurality of information terminals mutually interconnected through a radio-communication network and an information providing apparatus, wherein each of the plurality of information terminals comprises:

position fixing information acquisition means for acquiring position fixing information that fixes the present position of a user's own information terminal;

transmitting means for transmitting through the radio-communication network on demand the position fixing information of the user's own terminal acquired through the position fixing information acquisition means and for transmitting through the radio-communication network a request command for requesting position-related information about each information terminal belonging to a group identified by a predetermined password number;

receiving means for receiving through the radio-communication network the position-related information about each information terminal belonging to the group; and display means for displaying the position-related information of each information terminal by the receiving means; and wherein the information providing apparatus comprises:

map information storage means for storing map information of a local area assigned thereto;

receiving means for receiving positional information of each information terminal fed through the radio-communication network from the plurality of information terminals;

positional information storage means for sequentially storing positional information received by the receiving means on a group by group basis, wherein each group is identified by a predetermined password number; and transmitting means for transmitting, in response to a transmit request of positional information fed together with the password number by the information terminal, the positional information of each information terminal belonging to the group identified by the password number, together with associated map information read from the map information storage means to each information terminal belonging to the group identified by the password number.

* * * * *